United States Patent [19]

Akiyama et al.

[11] Patent Number: 4,985,510
[45] Date of Patent: Jan. 15, 1991

[54] CRYSTALLINE N-METHOXYMETHYLATED NYLON AND NYLON COMPOSITION

[75] Inventors: Setsuo Akiyama, Sagamihara; Hisanobu Monobe, Yokohama; Kazuo Naito, Kawasaki; Toshio Honda, Akigawa; Kazuo Tanaka, Tokyo, all of Japan

[73] Assignee: Bridgestone Corporation, Tokyo, Japan

[21] Appl. No.: 225,821

[22] Filed: Jul. 29, 1988

[30] Foreign Application Priority Data

Jul. 30, 1987 [JP] Japan .................................. 62-191299
Jul. 30, 1987 [JP] Japan .................................. 62-191300

[51] Int. Cl.$^5$ ...................... C08G 69/48; C08G 69/50

[52] U.S. Cl. .................. 525/427; 428/474.4; 428/475.5; 428/476.3; 524/606; 525/420; 525/426

[58] Field of Search ................ 525/427, 426, 420

[56] References Cited

U.S. PATENT DOCUMENTS 2,288,279   6/1942   Hopff et al. ........................ 525/427
2,430,867  11/1947   Foster et al. ....................... 525/427

Primary Examiner—Harold D. Anderson
Attorney, Agent, or Firm—Birch, Stewart, Kolasch & Birch

[57] ABSTRACT

Crystalline N-methoxymethylated nylon is useful to form a coating on a rubber substrate. It is prepared by adding acid to N-methoxymethylated nylon and heat treating the mixture for crystallization.

12 Claims, 3 Drawing Sheets

CRYSTALLINE N-METHOXYMETHYLATED NYLON AND NYLON COMPOSITION

BACKGROUND OF THE INVENTION

1. Field of the Invention

This invention relates to crystalline N-methoxymethylated nylon and composition of N-methoxymethylated nylon.

2. Discussion of Related Art

U.S. Pat. No. 4,657,285 assigned to the same assignee of the present invention discloses a nylon/rubber laminate which is prepared by surface treating a substrate of rubber blend and coating the substrate with a nylon solution to a thickness of up to 500 μm. This laminate exhibits excellent solvent resistance, gas impermeability, resistance against migration of ingredients in the rubber compound, and friction. This type of laminate is particularly useful as hoses, couplings, vibration insulators, electric parts, household implements, toys, and sporting goods. For example, rubber hoses having a nylon coated layer on their inner wall are of lighter weight and smaller size, more solvent resistant, and more gas impermeable than conventional hoses. The nylon coated hoses thus find applications for the passage of such fluid as Freon, gasoline and propane.

The nylons which are laminated on rubber are usually alcohol-soluble ternary or quaternary copolymer nylons and N-methoxymethylated nylons. However, the ternary or quaternary copolymer nylons, after being laminated on rubber, have the risk of cracking with repetition of very severe dynamic fatigue. The N-methoxymethylated nylons are fully resistant against flexural fatigue, but unsatisfactory in gas impermeability.

SUMMARY OF THE INVENTION

An object of the present invention is to provide a crystalline N-methoxymethylated nylon which has eliminated the drawbacks of the conventional N-methoxymethylated nylon.

Another object of the present invention is to provide a crystalline N-methoxymethylated nylon from which a coating having an improved gas impermeability is formed.

A further object of the present invention is to provide a crystalline N-methoxymethylated nylon which is useful in the manufacture of composite nylon articles such as nylon/rubber laminates.

A still further object of the present invention is to provide a nylon composition useful for the manufacture of crystalline N-methoxymethylated nylon.

According to a first aspect of the present invention, there is provided a crystalline N-methoxymethylated nylon having an endothermic peak temperature of at least 165° C. based on crystal melting when heated at a rate of 10° C./min.

According to a second aspect of the present invention, there is provided a crystalline N-methoxymethylated nylon exhibiting an infrared absorption spectrum in which the ratio of the absorbance of C—O—C at 1080 cm$^{-1}$ to that of NH at 3070 cm$^{-1}$ is up to 3.

According to a third aspect of the present invention, there is provided a composition comprising N-methoxymethylated nylon and an aromatic sulfonic acid.

BRIEF DESCRIPTION OF THE DRAWINGS

These and other objects, features, and advantages of the present invention will be better understood by reading the following description taken in conjunction with the accompanying drawings, in which.

DETAILED DESCRIPTION OF THE INVENTION

Figure 1:
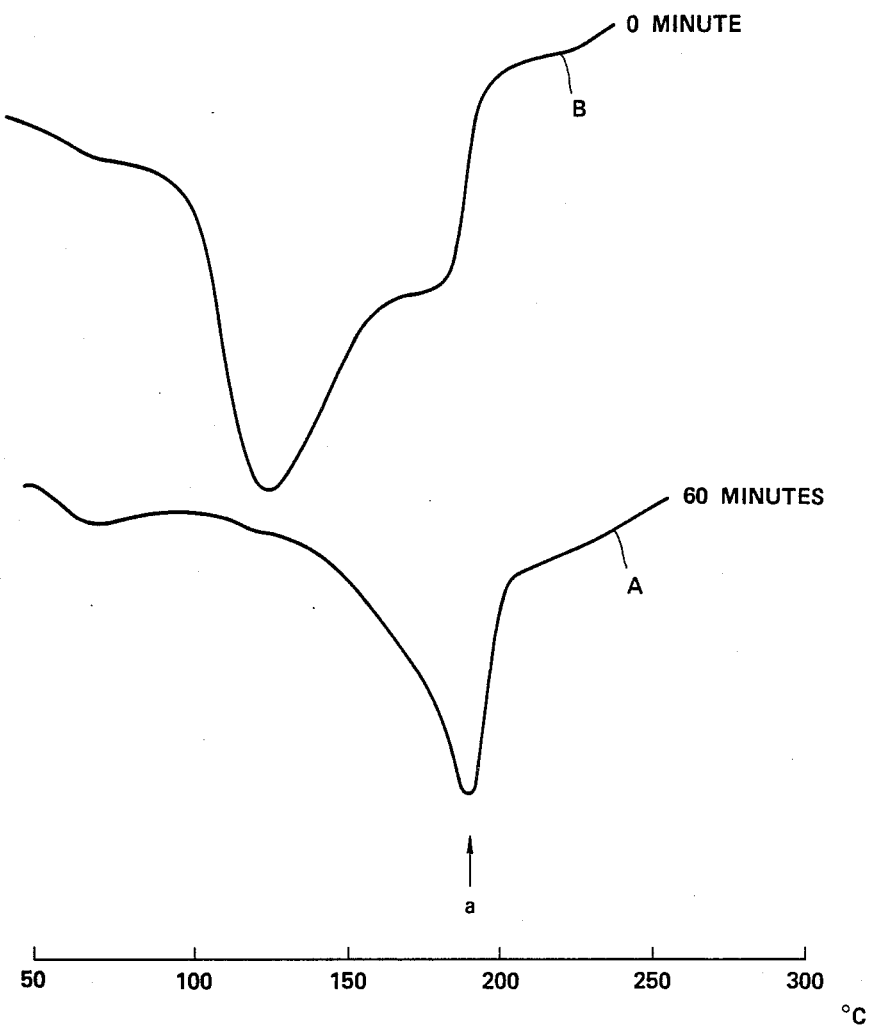
FIG. 1 is a diagram recorded by a scanning calorimeter of a coating of N-methoxymethylated nylon and p-toluenesulfonic acid, showing a structural change before and after heat treatment.

We have found that a crystalline nylon material having improved gas impermeability is obtained by crosslinking N-methoxymethylated nylon in the presence of an acid under conventional conditions, and further heat treating the crosslinked nylon.

It is known in the art that N-methoxymethylated nylon is crosslinked by adding acid thereto and heat treating the acid-containing nylon. The acid used as an agent for modifying physical properties, including citric acid, tartaric acid, glutaric acid, lactic acid, itaconic acid, maleic acid, oxalic acid, adipic acid, malonic acid, azelaic acid, succinic acid, glycolic acid, crotonic acid, hypophosphorous acid, lauric acid, chloroacetic acid, and boric acid. Preferred among others are citric acid, tartaric acid, glycolic acid, itaconic acid, maleic acid, hypophosphorous acid, oxalic acid, and malonic acid. It has been believed that when 100 parts by weight of N-methoxymethylated nylon is combined with 3 to 5 parts by weight of such an acid and heat treated at about 100° to about 140° C. for about 5 to about 15 minutes or at a higher temperature for a shorter time, demethoxylation occurs to form a methylene crosslinkage between two nitrogen atoms as shown below.

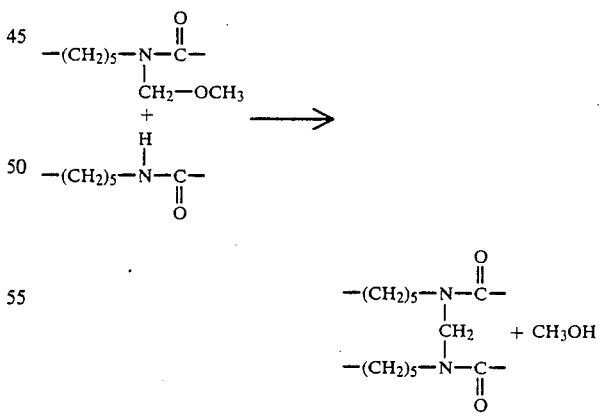

The above-mentioned treatment improves the stress-strain property and solvent resistance of N-methoxymethylated nylon. However, the gas impermeability of N-methoxymethylated nylon is low even after such a treatment.

The present inventors have found that when N-methoxymethylated nylon which has been crosslinked in the presence of an acid is further heat treated, unexpectedly the heat treatment promotes crystallization of N-methoxymethylated nylon, thereby improving the gas impermeability thereof. Crystallization of N-methoxymethylated nylon is advanced to improve the gas impermeability thereof by adding 0.5 to 15 parts by weight, more preferably 3 to 10 parts by weight of an acid, calculated as acid anhydride to 100 parts by weight of N-methoxymethylated nylon, heat treating the nylon at a temperature of about 100° to about 140° C. for about 5 to about 15 minutes, or at a higher temperature of about 170° to about 180° C. for several seconds to several minutes, thereby accomplishing crosslinking, and additionally heat treating the nylon at a temperature of about 40° to about 180° C. for about 1 minutes to about 30 days.

Among the acids, aromatic sulfonic acids are unexpectedly effective agents for modifying the physical properties, especially heat resistance, fatigue resistance and gas impermeability of N-methoxymethylated nylon. When a N-methoxymethylated nylon composition containing aromatic sulfonic acid, preferably a composition containing 100 parts by weight of N-methoxymethylated nylon and 0.05 to 6 parts by weight, more preferably 0.2 to 4 parts by weight of aromatic sulfonic acid calculated as acid anhydride is heat treated at a temperature of about 100° to about 140° C. for about 5 to about 15 minutes, or at a higher temperature of about 170° to about 180° C. for several seconds to about 1 minute to effect crosslinking, there is obtained a nylon coating which has improved stress-strain property and is highly resistant to heat aging in various atmospheres. When the crosslinked nylon is further heat treated at a temperature of about 70° to about 150° C. for about 10 minutes to about several ten hours, the nylon is promoted in crystallization to such an extent as to substantially improve the solvent resistance and gas impermeability thereof.

We have found that the crystalline N-methoxymethylated nylon which is crystallized by heat treating the crosslinked N-methoxymethylated nylon in the presence of acid shows an endothermic peak temperature of at least 165° C. based on crystal melting when it is heated at a rate of 10° C./min.

An analysis of the crystalline N-methoxymethylated nylon by infrared absorption spectroscopy shows that the ratio of the absorbance due to stretching of C—O—C at about 1080 cm$^{-1}$ to the absorbance due to deformation (overtone) of NH at about 3070 cm$^{-1}$ is up to 3/1.

Briefly stated, a crystalline N-methoxymethylated nylon according to a first aspect of the present invention has an endothermic peak temperature of at least 165° C. based on crystal melting when heated at a rate of 10°C./min.

A crystalline N-methoxymethylated nylon according to a second aspect of the present invention shows an infrared absorption spectrum in which the ratio of the absorbance due to the stretching of C—O—C at about 1080 cm$^{-1}$ to the absorbance due to the deformation or overtone of NH at about 3070 cm$^{-1}$ is up to 3/1.

The progress of crystallization of N-methoxymethylated nylon can be monitored using an endothermic peak temperature based on crystal melting or an infrared absorption spectrum as an indication. To determine the melting peak temperature of nylon, a sample is measured by a differential calorimeter by heating it at a rate of 10°C./min. Crystalline N-methoxymethylated nylon material exhibits improved gas impermeability when its melting peak temperature is at least 165° C., preferably at least 175° C., more preferably at least 185° C., and most preferably at least 200° C.

FIG. 1 is a diagram taken for nylons upon analysis by a scanning calorimeter. Curve A in FIG. 1 is for N-methoxymethylated nylon heat treated in the presense of p-toluenesulfonic acid and Curve B is for untreated N-methoxymethylated nylon. Those crystalline N-methoxymethylated nylon materials having a melting peak temperature of at least 165° C. as indicated at point a on Curve A are impermeable to gas. Those N-methoxymethylated nylon materials having a lower peak temperature as shown by Curve B are less impermeable to gas.

In infrared adsorption spectroscopy, the stretching of NH at about 3300 cm$^{-1}$, the deformation or overtone of NH at about 3070 cm$^{-1}$, the stretching of C—O at about 1640 cm$^{-1}$, and the stretching of C—O at about 1080 cm$^{-1}$ may be used as an indication for crystallization. Particularly when the ratio of the absorbance due to the stretching of C—O—C at about 1080 cm$^{-1}$ to the absorbance due to the deformation or overtone of NH at about 3070 cm$^{-1}$, that is, D1080 cm$^{-1}$/ D3070 cm$^{-1}$ is up to 3/1, preferably up to 5/2, more preferably up to 1/1, there are obtained N-methoxymethylated nylon materials having improved crystallinity and gas impermeability. It was found that the permeability to Freon 12 (Dupont) gas of nylon is closely correlated to its melting peak temperature or the ratio of the absorbance of C—O—C at 1080 cm$^{-1}$ to the absorbance of NH at about 3070 cm$^{-1}$.

Figure 2:
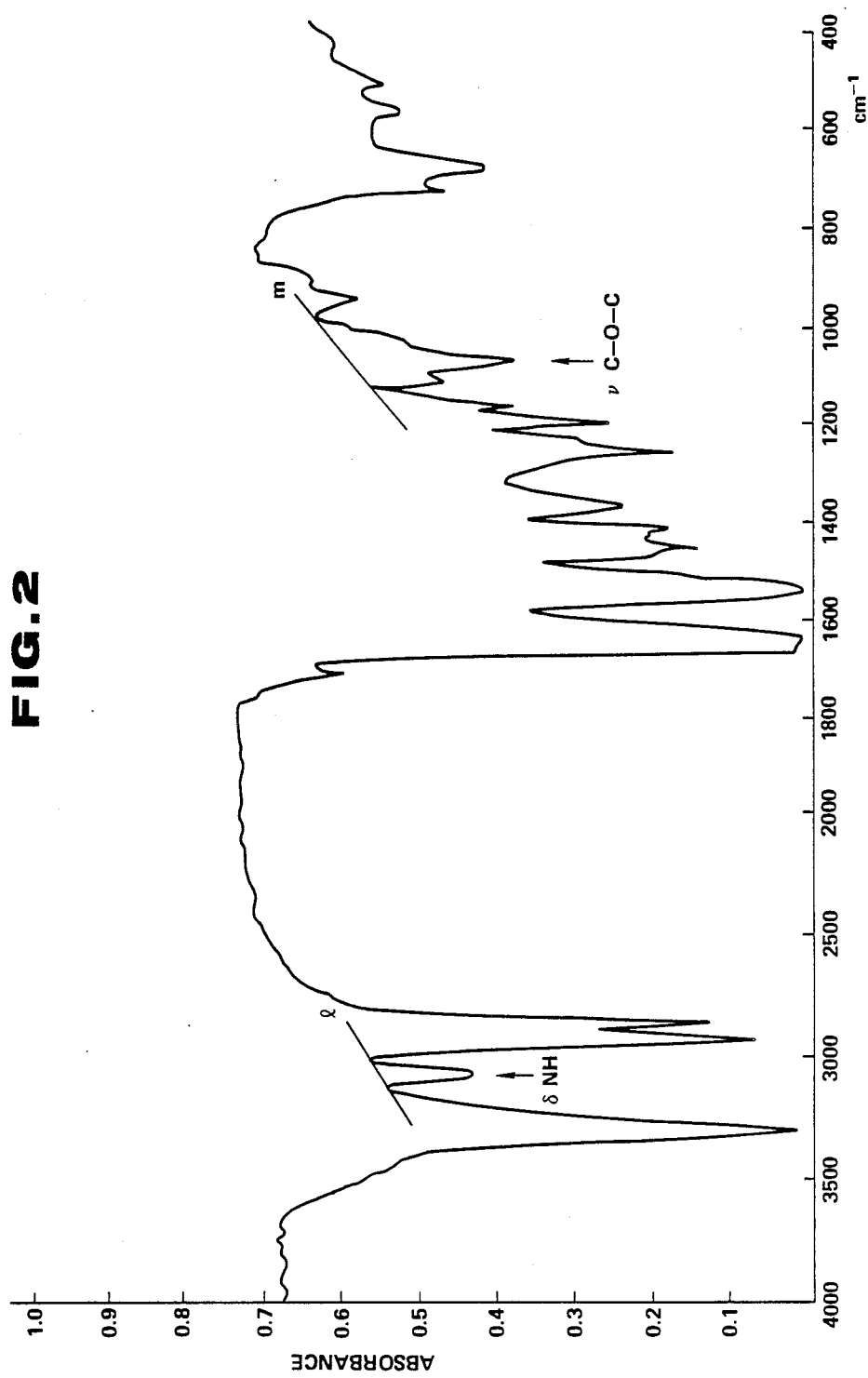
FIG. 2 is a diagram showing the infrared absorption spectrum of N-methoxymethylated nylon which has been heat treated in the presence of p-tolyuenesulfonic acid.
Figure 3:
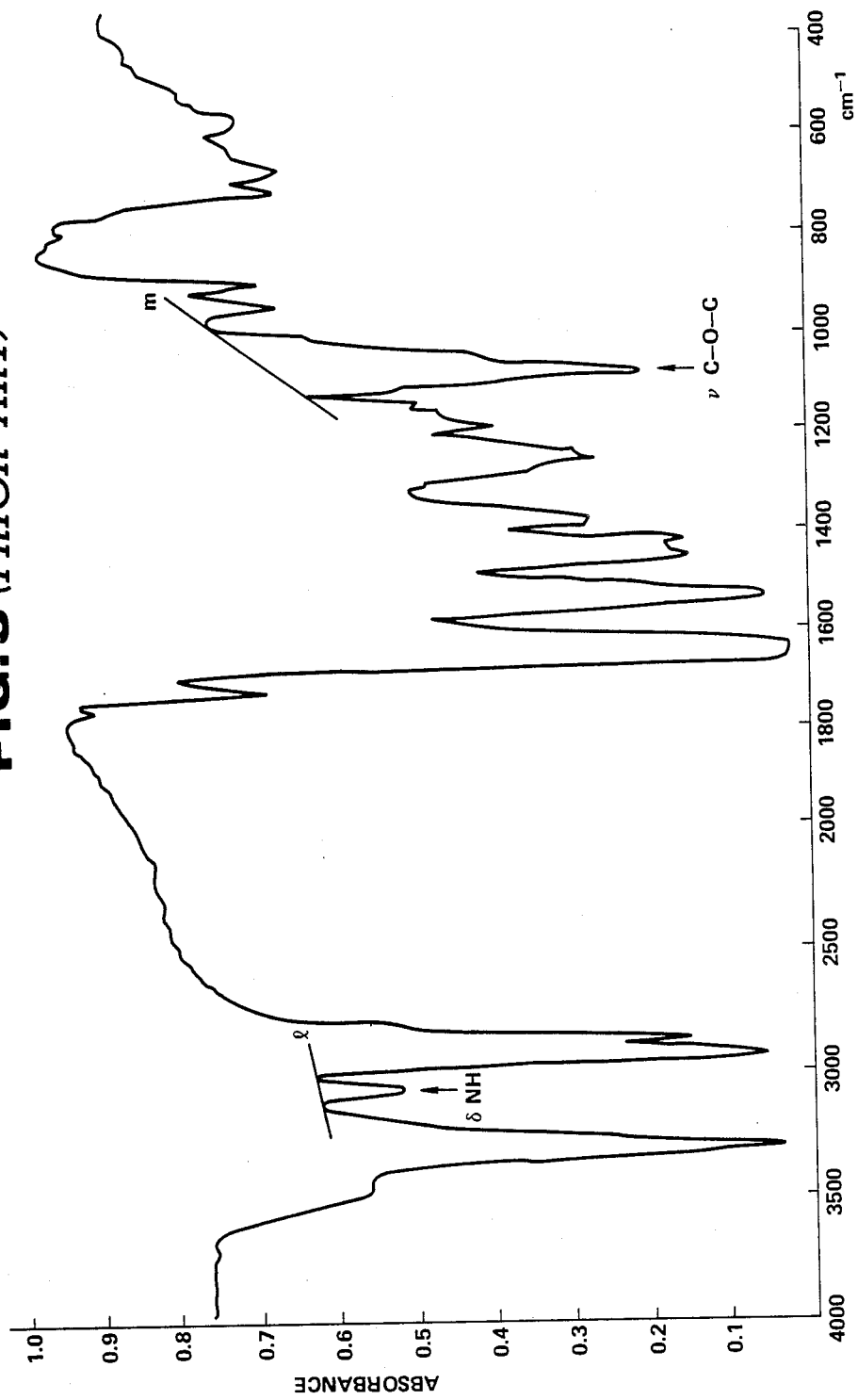
FIG. 3 is a diagram showing the infrared absorption spectrum of untreated N-methoxymethylated nylon.

FIGS. 2 and 3 show the infrared absorption spectra of a composition of N-methoxymethylated nylon and p-toluenesulfonic acid after and before heat treatment, respectively. The absorbance due to the stretching of C—O—C at about 1080 cm$^{-1}$ and the absorbance due to the deformation or overtone of NH at about 3070 cm$^{-1}$ are determined by drawing base lines l and m as shown in FIGS. 2 and 3, and determining the difference between the absorption peak at the wavelength and the corresponding base line.

In general, a crystalline N-methoxymethylated nylon according to the present invention is prepared by adding an acid to N-methoxymethylated nylon, causing the nylon to crosslink, and thereafter heat treating the crosslinked nylon for crystallization. The starting N-methoxymethylated nylon used herein may be obtained from various nylons, as by reacting a nylon such as nylon-6 with formaldehyde or methanol to substitute a methoxymethyl (CH$_3$—O—CH$_2$—) group for the hydrogen atom of an amide bond. The flexibility, impact resistance, elongation, solubility in solvent (mainly alcohol) and other properties of the N-methoxymethylated nylon may be controlled in terms of the degree of substitution. In order that the N-methoxymethylated nylon be soluble in alcohol, the degree of substitution of methoxymethyl group is preferably set to about 18% to about 60%, more preferably about 20 to about 40%, most preferably to about 30%.

The N-methoxymethylated nylon may be dissolved in a suitable solvent before use. Preferred solvents are alcohols. Lower alcohols such as methanol and ethanol are preferred among alcohol solvents. Also contemplated herein are mixtures of such alcohol with benzene, toluene, xylene, cresol, halogenated hydrocarbons, ethyl acetate, and water. The concentration of N-methoxymethylated nylon in solvent is not particularly limited, but preferably ranges from about 1 to 30% by weight, more preferably from about 5 to about 20% by weight.

According to the present invention, acid is added to N-methoxymethylated nylon. Examples of the acid used herein include aromatic sulfonic acids as well as citric acid, tartaric acid, glutaric acid, lactic acid, itaconic acid, maleic acid, oxalic acid, adipic acid, malonic acid, azelaic acid, succinic acid, glycolic acid, crotonic acid, hypophosphorous acid, lauric acid, chloroacetic acid, and boric acid. Preferred are aromatic sulfonic acids as well as citric acid, tartaric acid, glycolic acid, itaconic acid, maleic acid, hypophosphorous acid, oxalic acid, and malonic acid. The acids may be used alone or in admixture of two or more. Preferably, about 0.05 to about 6 parts by weight, more preferably about 0.2 to about 4 parts by weight of aromatic sulfonic acid calculated as acid anhydride is added to 100 parts by weight of N-methoxymethylated nylon. As to the other acids, about 0.5 to about 15 parts by weight, more preferably about 3 to about 10 parts by weight of acid calculated as acid anhydride is added to 100 parts by weight of N-methoxymethylated nylon.

It is not critical how to add acid to the nylon. The nylon may be milled with acid using a mixer such as a roll mill or Bunbary mixer. It is also possible to add acid to a nylon solution.

According to the present invention, N-methoxymethylated nylon having acid added thereto is first crosslinked. Crosslinking may be carried out at a temperature of about 50 to about 200° C. for about 5 seconds to about 30 minutes, more preferably at a temperature of about 100 to about 140° C. for about 5 to about 15 minutes or at a higher temperature of about 170 to about 180° C. for about 5 seconds to about 5 minutes. Crosslinking improves mechanical properties and solvent resistance.

According to the present invention, the crosslinked N-methoxymethylated nylon is subsequently heat treated for the purpose of further improving the impermeability of the nylon against gases such as Freon as well as mechanical properties and solvent resistance. Heat treatment may be carried out at a temperature of from about 40 to about 180° C. for about 30 seconds to about 30 days, more preferably at a temperature of about 70 to about 150° C. for about 10 minutes to about 60 hours. The heat treatment promotes crystallization of N-methoxymethylated nylon to thereby markedly improve the solvent resistance and gas impermeability thereof. It is to be noted that the heat treatment for crosslinking and the heat treatment for crystallization may be carried out either separately or continuously.

In the practice of the present invention, an aromatic sulfonic acid is the most preferred acid as described above. The addition of aromatic sulfonic acid will produce a nylon coating which is highly gas impermeable, fatigue resistant, and heat aging resistant.

Thus, a composition comprising N-methoxymethylated nylon and an aromatic sulfonic acid is also contemplated herein.

The aromatic sulfonic acid used herein includes para-toluenesulfonic acid, ortho-toluenesulfonic acid, meta-toluenesulfonic acid, benzenesulfonic acid, para-cresolsulfonic acid, ortho-cresolsulfonic acid, meta-cresolsulfonic acid, naphthalenesulfonic acid, and dodecylbenzenesulfonic acid. The sulfonic acids include acids and salts, and may be either anhydride or hydrate. The sulfonic acids may be used alone or in admixture of two or more. Preferably, about 0.05 to about 6 parts by weight, more preferably about 0.2 to about 4 parts by weight of aromatic sulfonic acid calculated as acid anhydride is added to 100 parts by weight of N-methoxymethylated nylon.

A nylon coating may be prepared from a N-methoxymethylated nylon composition having aromatic sulfonic acid added thereto through a heat treatment. The heat treatment is not particularly limited, but generally carried out at a temperature of about 50° to about 200° C. for about 5 seconds to about 24 hours. It is possible to leave the nylon in a crosslinked state without promoting crystallization. When the composition is crosslinked by heating at a temperature of about 100° to about 140° C. for about 5 to about 30 minutes or at a temperature of about 170° to about 180° C. for about 5 seconds to about 1 minute, there is obtained a nylon coating which has improved stress-strain property and is resistant to heat aging in various atmospheres. When the crosslinked nylon is further heat treated at a temperature of about 40° to about 180° C. for about 1 minute to about 30 days, preferably at a temperature of about 70° to about 150° C. for about 10 minutes to about 50 hours, there is obtained a crystalline nylon which has significantly improved gas impermeability.

The N-methoxymethylated nylon composition may contain any suitable additives in addition to the requisite ingredient depending on the intended application thereof. The additives used herein include plasticizers, coloring agents, antioxidants, UV absorbers, and fillers, for example, organic an inorganic short fibers of such as carbon black, silica, titanium white, clay and calcium carbonate. Any additives may be blended in the composition before it is heat treated.

Since the heat treated N-methoxymethylated nylon of the present invention has flexibility, elongation, tensile strength, solvent resistance and gas impermeability, it may be used to impregnate organic and inorganic woven fabrics, nonwoven fabric and matts therewith, impart corrosion resistance, water proofness, solvent resistance, and texture to paper, wood, metal, plastics, elastomers, leather, glass, and ceramics, or as adhesive. The nylon is also very useful in the manufacture of various composite materials. Particularly, a laminate of vulcanized rubber with a nylon coating (e.g. the nylon coating is adhered to the inside wall of the rubber tube) has satisfactory solvent resistance and gas impermeability even when the coating is as thin as 100 μm or less. The nylon coating of the present invention thus finds a variety of applications in rubber hoses, couplings, vibration insulators, rubber screens, fenders, conveyor belts, O rings, gaskets, household items, electric appliances, toys and sports goods.

The N-methoxymethylated nylon composition according to the present invention may be applied to a substrate by any desired means such as laminating, coating, and impregnating as described above. The composition may be combined with rubber preferably after the surface of rubber is pretreated as by buffing, treatment with sulfuric acid, chlorination, treatment with methylene iodide, treatment with pseudo-halides such as halogenated succinimide, halogenated isocyanuric acid, halogenated hydantoin, and N,N-dihalosulfonamide, plasma treatment, corona treatment, and combinations thereof.

The present invention provides a crystalline N-methoxymethylated nylon which is flexible and satisfactorily gas impermeable so that it is useful to manufacture composite nylon articles such as nylon/rubber laminates. A nylon coating having improved properties can be readily formed from the composition of the present invention.

EXAMPLES

Examples of the present invention are given below by way of illustration and not by way of limitation.

EXAMPLE 1

A nylon composition was prepared by adding each of the organic acid catalysts reported in Table 1 to a methanol solution containing 15% by weight of N-methoxymethylated nylon (Tresin EF30T, manufactured and sold by Teikoku Chemical K.K.).

The nylon composition was applied to the inner surface of an automobile air-conditioner hose having an inner tube of nitrile rubber with an outer diameter of 20 mm and an inner diameter of 10 mm to form a nylon coating having a thickness of about 15 μm. The coated hose was evaluated for its performance as automobile air-conditioner hose.

The coating method used was the same as disclosed in U.S. Pat. No. 4,657,285. More particularly, the nylon coating was formed by applying 0.5% by weight of N,N-dichloro-p-toluene sulfonamide in acetone to the rubber hose inner wall for its surface treatment, air drying the treated inner wall, filling the hose with a methanol solution containing 15% by weight of N-methoxymethylated nylon (Tresin EF 30T) and the acid catalyst, quickly emptying the hose of the solution, air drying the coated inner wall for one hour to form a thin film, heating the hose in an oven at a temperature of 120° C. for 20 minutes to cause crosslinking, and heat treating the hose under the conditions reported in Table 1.

The thickness of the nylon coating was measured by cutting the hose and observing the hose section under a scanning electron microscope. Tests were carried out to evaluate the performance of the hose, including a gas permeation test and an impulse or hydraulic pressure test.

The gas permeation or gas leakage test was carried out by charging a hose of 1 m long with Freon-12 (Dupont) in an amount of 0.6 g per cubic centimeter of hose interior volume, sealing the hose, and heating the Freon-charged hose in an oven at a temperature of 100° C. for 96 hours. A weight loss of the hose per 1-m length during the last 72-hours period of the test was determined.

Each nylon coating was analyzed for endothermic peak temperature with a scanning calorimeter (Model 910-990 manufactured by duPont) by heating at a rate of 10° C./min. It was also analyzed by infrared absorption spectroscopy using a spectrometer (Model 260-50 manufactured by Hitachi, Ltd.) to determine the ratio of the absorbance due to stretching of C—O—C at about 1080 $cm^{-1}$ to the absorbance due to deformation or overtone of NH at about 3070 $cm^{-1}$.

TABLE 1

| Run No. | Catalyst Type | pbw* | Crosslinking Temp. Time | Heat treatment Temp. Time |
|---|---|---|---|---|
| 1 | Tartaric acid | 3 | 120° C./20 min. | 140° C./60 min. |
| 2 | Tartaric acid | 3 | 120° C./20 min. | no |
| 3 | Tartaric acid | 10 | 120° C./20 min. | 130° C./60 min. |
| 4 | Tartaric acid | 10 | 120° C./20 min. | no |
| 5 | Oxaric acid | 5 | 120° C./20 min. | 140° C./60 min. |
| 6 | Oxaric acid | 5 | 120° C./20 min. | no |
| 7 | Citric acid | 3 | 120° C./20 min. | 120° C./60 min. |
| 8 | Citric acid | 3 | 120° C./20 min. | no |

TABLE 1-continued

| Run No. | Endothermic peak temperature (°C.) | D1080 $cm^{-1}$/ D3070 $cm^{-1}$ | Gas permeation (g/72 hrs. m) | Remarks |
|---|---|---|---|---|
| 1 | 170 | 2.6 | 20 | Invention |
| 2 | 135 | 5.0 | 50 | Comparison |
| 3 | 195 | 1.3 | 6.5 | Invention |
| 4 | 130 | 5.2 | 55 | Comparison |
| 5 | 195 | 1.3 | 7.0 | Invention |
| 6 | 135 | 5.0 | 45 | Comparison |
| 7 | 190 | 1.6 | 9.0 | Invention |
| 8 | 133 | 5.1 | 50 | Comparison |

It is to be noted that the maximum permissible amount of Freon-12 gas permeated through commercial rubber hoses for automobile air-conditioners is prescribed to be 25 g/72 hrs. m by the Japan Refrigeration and Air Conditioning Industrial Association. As is evident from Table 1, those hoses (run Nos. 2, 4, 6 and 8) which had not been heat treated showed a gas permeation amount in excess of the standard value independent of the type of catalyst used, and were thus unsatisfactory in gas impermeability. Those hoses (run Nos. 1, 3, 5 and 7) which had been heat treated showed significantly improved gas impermeability.

EXAMPLE 2

A nylon composition was prepared by adding 15% by weight of N-methoxymethylated nylon (Tresin EF30T, manufactured and sold by Teikoku Chemical K.K.) to methanol and adding 1% by weight based on the weight of the nylon of p-toluenesulfonic acid to the methanol solution.

The nylon composition was cast to form a film of 100 μm thick. The film was punched out by a DIN No. 2 blade punch, heated in an oven at a temperature of 120° C. for 72 hours, and then tested for stress-strain properties by a tensile tester. Heat aging was evaluated from the stress-strain curve. The film was heat aged at 120° C. in different atmospheres of air, Freon 12, MIL Standards 5606 oil, and Suniso 5GS oil (manufactured and sold by Nun Oil Company). It is to be noted that Freon 12 is used as a refrigerant for automobile air-conditioners, MIL 5606 oil is used as an impulse oil, and Suniso 5GS oil is used in automobile air-conditioner compressors.

The tensile test used an autographic tester manufactured by Shimazu Mfg. K. K. The film on test was heat aged before it was tested at a pulling rate of 5 mm/min. at room temperature.

The results are shown in Table 2.

TABLE 2

| Heat aged in | Breaking strength (kg/cm²) | Elongation at break |
|---|---|---|
| air | not broken up to 20% elongation (strength 675, 20%) | >20% |
| Freon-12 | not broken up to 20% elongation (strength 700, 20%) | >20% |
| MIL 5606 oil | not broken up to 20% elongation (strength 700, 20%) | >20% |
| Suniso 5GS oil | not broken up to 20% elongation (strength 675, 20%) | >20% |

The nylon coating showed an endothermic peak temperature of 195° C. and a ratio of absorbance at 1080 $cm^{-1}$ to 3070 $cm^{-1}$ of 1.3.

As is evident from the data of Table 2, a coating of N-methoxymethylated nylon having a minor amount of p-toluenesulfonic acid catalyst added is fully resistant to rupture when heat aged in various atmospheres.

EXAMPLE 3

On the inner wall of a nitrile rubber based hose having an outer diameter of 20 mm and an inner diameter of 10 mm for automobile air-conditioners, a coating of N-methoxymethylated nylon (Tresin EF30T, Teikoku Chemical K.K.) containing 1% of aromatic sulfonic acid was formed to a thickness of 10 to 20 μm. The coated hose was evaluated for its performance as an automobile air-conditioner hose.

For comparison purpose, a similar hose was coated with a ternary copolymer nylon (CM4000, Toray K.K.) instead of the N-methoxymethylated nylon.

The coating method used was the same as disclosed in U.S. Pat. No. 4,657,285. More particularly, the nylon coating was formed by applying 0.5% by weight of N,N-dichloro-p-toluene sulfonamide in acetone to the rubber hose inner wall for its surface treatment, air drying the treated inner wall, filling the hose with a methanol solution containing 15% by weight of N-methoxymethylated nylon (Tresin EF30T) and the aromatic sulfonic acid, quickly emptying the hose of the solution, air drying the coated inner wall for one hour to form a thin film, and heating the hose in an oven at a temperature of 130° C. for 60 minutes.

The thickness of the nylon coating was measured by cutting the hose and observing the hose section under a scanning electron microscope. Tests were carried out to evaluate the performance of the hose, including a gas permeation test and an impulse or hydraulic pressure test.

The gas permeation or gas leakage test was carried out by charging a hose of 1 m long with Freon-12 in an amount of 0.6 g per cubic centimeter of hose interior volume, sealing the hose, and heating the Freon-charged hose in an oven at a temperature of 100° C. for 96 hours. A weight loss of the hose per 1-m length during the last 72-hours period of the test was determined.

The impulse test was carried out by charging the hose with MIL Standards 5606 oil, placing the charged hose in a pressurizing device at a temperature of 100° C., and alternately applying pressure to the hose to alternately achieve internal pressures of 0 kg/cm$^2$ and 30 kg/cm$^2$. Pressure application was carried out 150,000 times at a rate of 45 applications per minute. At the end of the test, the hose was cut to examine any breakage on the inner wall.

The results are shown in Table 3.

both gas impermeability and impulse resistance as seen from Table 3.

EXAMPLE 4

A hose for automobile air-conditioners was prepared by the same procedure as in Example 3 by coating it with an N-methoxymethylated nylon composition containing 1% by weight of p-toluene-sulfonic acid and heat treating at 140° C. for 30 minutes. The hose was examined for permeability to gas, Freon 134a. The results are shown in Table 4.

TABLE 4

|  | Gas permeation (g/72 hrs. m) |
| --- | --- |
| Example 4 | 5.4 |
| Control (uncoated hose) | 40 |

The nylon coating formed in this example had an endothermic peak temperature of 195° C. and a ratio of absorbance, D 1080 cm$^{-1}$/D 3070 cm$^{-1}$, of 1.4.

As is evident from Table 4, the nylon coating according to the present invention is fully impermeable to Freon 134a.

EXAMPLE 5

A hose for automobile air-conditioners was prepared by the same procedure as in Example 3 by coating it with a composition containing N-methoxymethylated nylon (Tresin EF30T, Teikoku Chemical K.K.) and 1% by weight of p-toluene-sulfonic acid and heat treating under different conditions. The nylon coating formed was measured for endothermic peak temperature and ratio of absorbance, D 1080 cm$^{-1}$/D 3070 cm$^{-1}$, by the same procedures as in Example 1. The hose was examined for permeability to gas, Freon 12. The results are shown in Tables 5 and 6.

TABLE 5

| Endothermic peak temperature | Gas permeation (g/72 hrs. m) |
| --- | --- |
| 135° C. | 40 |
| 165° C. | 30 |
| 185° C. | 12 |
| 200° C. | 4 |

TABLE 6

| D1080 cm$^{-1}$/D3070 cm$^{-1}$ | Gas permeation (g/72 hrs. m) |
| --- | --- |
| 5 | 40 |
| 3 | 30 |
| 2.5 | 22 |
| 1 | 4 |

TABLE 3

| Coating | Endothermic peak temperature (°C.) | D1080 cm$^{-1}$/D3070 cm$^{-1}$ | Gas permeation (g/72 hrs. m) | Inner wall after impulse test (100° C.) | |
| --- | --- | --- | --- | --- | --- |
| N-methoxymethylated nylon containing 1 wt % of | | | | | |
| p-toluenesulfonic acid | 200 | 1.1 | 4.5 | no rupture | Invention |
| benzenesulfonic acid | 197 | 1.3 | 5 | no rupture | " |
| dodecylbenzenesulfonic acid | 193 | 1.5 | 7 | no rupture | " |
| cresolsulfonic acid | 195 | 1.4 | 6 | no rupture | " |
| naphthalenesulfonic acid | 191 | 1.6 | 9 | no rupture | " |
| Ternary copolymer nylon (CM4000) | — | — | 3.0 | cracks | Comparison |

Since gas impermeability and impulse resistance are generally of mutually opposing nature, it is difficult to find a compromise therebetween. Nevertheless, the N-methoxymethylated nylon composition having aromatic sulfonic acid catalyst added ensures that a hose coated therewith shows satisfactory performance in As seen from the data of Tables 5 and 6, the amount of Freon 12 permeated is closely correlated to the endothermic peak temperature and the ratio of absorbance, D1080 cm$^{-1}$/D3070 cm$^{-1}$.

A sample was prepared by the same procedure as above by heat treating an N-methoxymethylated nylon composition containing 1% by weight of p-toluenesulfonic acid at 120° C. for 60 minutes. This sample was observed for structure both before and after the heat treatment by using a scanning calorimeter (Model 910-990 manufactured by duPont) and heating the sample at a temperature rise rate of 10° C./min. The results are shown in FIG. 1 in which Curve A corresponds to the heat treated sample and Curve B corresponds to the sample before the heat treatment. As is evident from the diagram, an endothermic peak due to crystal melting is shifted to a higher temperature and increased to a larger quantity by the heat treatment, indicating that the heat treatment had advanced crystallization.

Another sample was prepared by the same procedure as above by heat treating an N-methoxymethylated nylon composition containing 1% by weight of p-toluenesulfonic acid at 140° C. for 60 minutes. This sample was analyzed by infrared spectroscopy both before and after the heat treatment. FIG. 2 is the infrared spectrum of the heat treated sample. FIG. 3 is the infrared spectrum of the sample before the heat treatment.

EXAMPLE 6

This example is to evaluate the stretch fatigue resistance of a nylon coating formed from a N-methoxymethylated nylon (Tresin EF30T, Teikoku Chemical K.K.) composition having 1% p-toluene-sulfonic acid added. A coating of 30 μm thick was formed on a vulcanized rubber sheet of 1 mm thick from the nylon composition by following the same procedure as in Example 2. Two test pieces were punched out of the coated sheet with a DIN No. 3 blade. One test piece was directly tested for stretch fatigue. The other test piece was heat aged by maintaining it in an oven at 120° C. for 7 days. Using a stretch fatigue testing machine, stretch fatigue was applied to a strain of 15% at 100° C. and a frequency of 400 times/min. The test pieces were observed for rupture.

For comparison purpose, a similar test was carried out on a rubber sheet coated with ternary copolymer nylon (CM4000, Toray K.K.).

The results are shown in Table 7.

TABLE 7

| Coating | Not heat aged | Heat aged 120° C./7 days |
|---|---|---|
| Example 6 Tresin EF30T containing 1 wt % p-toluenesulfonic acid | no rupture over 1,700,000 | no rupture over 2,370,000 |
| Comparative Example ternary copolymer nylon CM4000 | cracked at 500,000 | cracked at 100,000 |

As seen from Table 7, the N-methoxymethylated nylon composition having p-toluenesulfonic acid added forms a nylon coating which is satisfactorily resistant to stretch fatigue.

The nylon coating formed in this example had an endothermic peak temperature of 195° C. and a ratio of absorbance, D1080 cm$^{-1}$/D3070 cm$^{-1}$, of 1.4.

Although preferred embodiments of the present invention are described, obviously numerous modifications and variations of the present invention are possible in light of the above teachings. It is therefore to be understood that within the scope of the appended claims, the invention may be practiced otherwise than as specifically described herein.

What is claimed is:

1. A crystalline N-methoxymethylated nylon having an endothermic peak temperature of at least 165° C. based on crystal melting when heated at a rate of 10° C./min.

which is prepared by adding about 0.5 to 15 parts by weight of an acid to 100 parts by weight of an N-methoxymethylated nylon to form a mixture and heat treating the mixture to crystallize the N-methoxymethylated nylon, wherein the acid is selected from the group consisting of citric acid, tartaric acid, glutaric acid, lactic acid, itaconic acid, azelaic acid, succinic acid, glycolic acid, crotonic acid, hypophosphorous acid, lauric acid, chloroacetic acid, boric acid and mixtures thereof, and wherein the heat treating is carried out at a temperature of from about 40° C. to 180° C. for about 30 seconds to 30 days.

2. A crystalline N-methoxymethylated nylon exhibiting an infrared absorption spectrum in which the ratio of the absorbance of C—O—C at about 1080 cm$^{-1}$ to the absorbance of NH at about 3070 cm$^{-1}$ is up to 3, which is prepared by adding an acid to an N-methoxymethylated nylon to form a mixture and heat treating the mixture to crystallize the N-methoxymethylated nylon, wherein the heat treating is carried out at a temperature of from about 40° C. to 180° C. for about 30 seconds to 30 days.

3. A crystalline N-methoxymethylated nylon having an endothermic peak temperature of at least 165° C. based on crystal melting when heated at a rate of 10° C./min., which is prepared by adding about 0.05 to 6 parts by weight of an aromatic sulfonic acid to 100 parts by weight of an N-methoxymethylated nylon to form a mixture and heat treating the mixture to crystallize the N-methoxymethylated nylon, wherein the heat treating is carried out at a temperature of from about 50° C. to 200° C. for about 5 seconds to 24 hours.

4. A crystalline N-methoxymethylated nylon exhibiting an infrared absorption spectrum in which the ratio of the absorbance of C—O—C at about 1080 cm$^{-1}$ to the absorbance of NH at about 3070 cm$^{-1}$ is up to 3, which is prepared by adding about 0.05 to 6 parts by weight of an aromatic sulfonic acid to 100 parts by weight of an N-methoxymethylated nylon to form a mixture and heat treating the mixture to crystallize the N-methoxymethylated nylon, wherein the heat treating is carried out at a temperature of from about 50° C. to 200° C. for about 5 seconds to 24 hours.

5. A crystalline N-methoxymethylated nylon having an endothermic peak temperature of at least 165° C. based on crystal melting when heated at a rate of 10° C./min., which is prepared by adding an aromatic sulfonic acid to an N-methoxymethylated nylon to form a mixture and heat treating the mixture to crystallize the N-methoxymethylated nylon, wherein the heat treating comprises heating the N-methoxymethylated nylon at a temperature of about 50° C. to 200° C. for about 5 seconds to 30 minutes to crosslink the N-methoxymethylated nylon, and further heating the crosslinked N-methoxymethylated nylon at a temperature of from about 40° C. to 180° C. for about 1 minute to 30 days to crystallize the crosslinked N-methoxymethylated nylon.

6. A crystalline N-methoxymethylated nylon exhibiting an infrared absorption spectrum in which the ratio of the absorbance of C—O—C at about 1080 cm$^{-1}$ to the absorbance of NH at about 3070 cm$^{-1}$ is up to 3, which is prepared by adding an aromatic sulfonic acid to an N-methoxymethylated nylon to form a mixture and heat treating the mixture to crystallize the N-methoxymethylated nylon, wherein the heat treating comprises heating the N-methoxymethylated nylon at a temperature of about 50° C. to 200° C. for about 5 seconds to 30 minutes to crosslink the N-methoxymethylated nylon, and further heating the crosslinked N-methoxymethylated nylon at a temperature of from about 40° C. to 180° C. for about 1 minute to 30 days to crystallize the crosslinked N-methoxymethylated nylon.

7. The crystalline N-methoxymethylated nylon according to claim 3, wherein the amount of the sulfonic acid added is about 0.2 to 4 parts by weight.

8. The crystalline N-methoxymethylated nylon according to claim 4, wherein the amount of the sulfonic acid added is about 0.2 to 4 parts by weight.

9. The crystalline N-methoxymethylated nylon according to claim 3, wherein the aromatic sulfonic acid is selected from the group consisting of para-toluenesulfonic acid, ortho-toluenesulfonic acid, meta-toluenesulfonic acid, benzenesulfonic acid, para-cresolsulfonic acid, ortho-cresolsulfonic acid, metacresolsulfonic acid, naphthalenesulfonic acid, dodecylbenzenesulfonic acid and mixtures thereof.

10. The crystalline N-methoxymethylated nylon according to claim 4, wherein the aromatic sulfonic acid is selected from the group consisting of para-toluenesulfonic acid, ortho-toluenesulfonic acid, meta-toluenesulfonic acid, benzenesulfonic acid, para-cresolsulfonic acid, ortho-cresolsulfonic acid, meta-cresolsulfonic acid, naphthalenesulfonic acid, dodecylbenzenesulfonic acid and mixtures thereof.

11. The crystalline N-methoxymethylated nylon according to claim 5, wherein the aromatic sulfonic acid is selected from the group consisting of para-toluenesulfonic acid, ortho-toluenesulfonic acid, meta-toluenesulfonic acid, benzenesulfonic acid, para-cresolsulfonic acid, ortho-cresolsulfonic acid, meta-cresolsulfonic acid, naphthalenesulfonic acid, dodecylbenzenesulfonic acid and mixtures thereof.

12. The crystalline N-methoxymethylated nylon according to claim 6, wherein the aromatic sulfonic acid is selected from the group consisting of para-toluenesulfonic acid, ortho-toluenesulfonic acid, meta-toluenesulfonic acid, benzenesulfonic acid, para-cresolsulfonic acid, ortho-cresolsulfonic acid, meta-cresolsulfonic acid, naphthalenesulfonic acid, dodecylbenzenesulfonic acid and mixtures thereof.

* * * * *